(12) United States Patent
Muller et al.

(10) Patent No.: US 11,687,097 B2
(45) Date of Patent: Jun. 27, 2023

(54) METHOD AND SYSTEM ALLOWING AUTOMATIC TAKE-OFF OF AN AIRCRAFT

(71) Applicants: Airbus (S.A.S.), Blagnac (FR); Airbus Operations (S.A.S.), Toulouse (FR)

(72) Inventors: Jean Muller, Toulouse (FR); Charles Renault Leberquer, Blagnac (FR); Mathieu Brunot, Toulouse (FR); Maxime Keller, Blagnac (FR)

(73) Assignees: Airbus (S.A.S.), Blagnac (FR); Airbus Operations (S.A.S.), Toulouse (FR)

( * ) Notice: Subject to any disclaimer, the term of this patent is extended or adjusted under 35 U.S.C. 154(b) by 76 days.

(21) Appl. No.: 17/387,099

(22) Filed: Jul. 28, 2021

(65) Prior Publication Data

US 2022/0100206 A1 Mar. 31, 2022

(30) Foreign Application Priority Data

Jul. 30, 2020 (FR) ..................................... 2008114

(51) Int. Cl.
*G05D 1/00* (2006.01)
*G05D 1/04* (2006.01)
(Continued)

(52) U.S. Cl.
CPC ............. *G05D 1/042* (2013.01); *B64D 47/08* (2013.01); *G06T 7/70* (2017.01); *G06T 2207/30252* (2013.01)

(58) Field of Classification Search
CPC . G05D 1/042; G06T 7/70; G06T 2207/30252; B64D 47/08
(Continued)

(56) References Cited

U.S. PATENT DOCUMENTS

2004/0059497 A1* 3/2004 Sankrithi ............. G08G 5/0021
701/120
2009/0201197 A1* 8/2009 Coulmeau .............. G08G 5/065
342/357.65
(Continued)

FOREIGN PATENT DOCUMENTS

CN 109 240 330 A 1/2019
FR 3024127 A1 1/2016
(Continued)

OTHER PUBLICATIONS

French Search Report for Application No. 2008114 dated Apr. 13, 2021.

*Primary Examiner* — Tyler J Lee
*Assistant Examiner* — Tiffany P Ohman
(74) *Attorney, Agent, or Firm* — KDW Firm PLLC

(57) ABSTRACT

A method and system allowing fully autonomous automatic take-off using only images captured by cameras on the aircraft and avionics data. The system includes an image capture device on the aircraft to take a stream of images of the runway, image processing modules to estimate, on the basis of the streams of images, a preliminary current position of the aircraft on the runway and to assign a preliminary confidence index to the estimate. A data consolidation module can determine a relevant current position of the aircraft on the runway by consolidating data originating from the image processing modules with inertial data to correct the estimate of the preliminary current position and determine a relevant confidence index using a current speed of the wheels of the aircraft to refine the preliminary confidence index. A flight control computer can control and guide aircraft take-off.

18 Claims, 5 Drawing Sheets

(51) Int. Cl.
*G06T 7/70* (2017.01)
*B64D 47/08* (2006.01)

(58) Field of Classification Search
USPC .......................................................... 701/15
See application file for complete search history.

(56) References Cited

U.S. PATENT DOCUMENTS

| | | |
|---|---|---|
| 2010/0200704 A1 | 8/2010 | Berens et al. |
| 2014/0114557 A1* | 4/2014 | Nutaro ................. G05D 1/0083 |
| | | 701/120 |
| 2019/0122572 A1 | 4/2019 | Morellec et al. |
| 2020/0216190 A1 | 7/2020 | Schwindt |
| 2021/0334984 A1* | 10/2021 | Gauci ....................... G06T 7/13 |

FOREIGN PATENT DOCUMENTS

| | | |
|---|---|---|
| FR | 3044807 A1 | 6/2017 |
| RU | 2 550 887 C2 | 5/2015 |

\* cited by examiner

METHOD AND SYSTEM ALLOWING AUTOMATIC TAKE-OFF OF AN AIRCRAFT

CROSS-REFERENCE TO RELATED APPLICATION

This application claims priority to French patent application FR 20 08114 filed on Jul. 30, 2020, the entire disclosure of which is incorporated by reference herein.

TECHNICAL FIELD

The disclosure herein generally relates to the field of aeronautics, and more specifically to that of assisted take-off systems.

BACKGROUND

During a take-off phase, various systems and sources of information are used to facilitate the task of the pilots. These systems require specific ground-based infrastructures and use radio signals to guide the aircraft in relation to the axis of the runway. They nevertheless have the disadvantage of not being available in all airports, particularly due to their high costs and operating constraints.

Furthermore, since the current satellite positioning systems do not allow the precision required to perform a take-off to be obtained, the systems must be augmented by ground-based reference stations, such as those of the WAAS (Wide Area Augmentation System) or EGNOS (European Geostationary Navigation Overlay Service) networks. These systems are not yet widespread and have a relatively low level of availability.

The subject matter of the disclosure herein is an automatic take-off system that is particularly autonomous, is reliable, and that can operate with the complete or partial absence of information relating to the runway, while dispensing with specific ground-based infrastructures and augmented satellite positioning systems.

SUMMARY

The disclosure herein relates to a system allowing automatic take-off of an aircraft from a runway, comprising:
- an image capture device on board the aircraft and intended to take a stream of images of the runway;
- image processing modules configured to estimate, on the basis of the streams of images, a preliminary current position of the aircraft on the runway and to assign a preliminary confidence index to the estimate;
- a data consolidation module configured to determine a relevant current position of the aircraft on the runway by consolidating data originating from the image processing modules with inertial data in order to correct the estimate of the preliminary current position and to determine a relevant confidence index by taking into account a current speed of the wheels of the aircraft in order to refine the preliminary confidence index; and
- a flight control computer configured to control and to guide the take-off of the aircraft as a function of the relevant current position and of the relevant confidence index received from the consolidation module.

This automatic take-off system is autonomously based on a vision device on board the aircraft, while assigning a precise and real-time confidence index to the images taken by the vision device, Indeed, the confidence index assigned to the vision varies as a function of the intrinsic confidence of image processing, and as a function of the measurement of the wheel speed. Thus, this system safely dispenses with all other external sources of information that can be unavailable in some airports. This system does not require specific ground-based infrastructures or augmented satellite positioning systems. The take-off phase thus can be carried out without intervention from the pilot and without the use of non-autonomous data, such as the GPS or the airport signals.

Advantageously, the consolidation module is configured to determine the relevant confidence index by multiplying the preliminary confidence index by a multiplying factor associated with a current take-off sub-phase from among a predetermined set of take-off sub-phases, with a specific multiplying factor being associated with each take-off sub-phase.

Thus, the confidence in the images is precisely updated upon each take-off step.

Advantageously, the predetermined set of take-off sub-phases comprises:
- a first final turn sub-phase associated with a state of alignment of the aircraft on the runway, the first sub-phase triggering the start of the data consolidation, the completion of the first sub-phase occurring when the absolute value of a yaw rate of the aircraft falls below a first predetermined rotation speed threshold for at least one predetermined duration;
- a second stop sub-phase associated with a possible stop before throttling up, the second sub-phase being detected by the transition of the wheel speed to a value below a second predetermined threshold;
- a third acceleration sub-phase associated with an acceleration up to rotation, the third sub-phase being detected by the transition of the wheel speed to a value above a third predetermined threshold;
- a fourth start of flight sub-phase associated with a period beginning with the take-off of the nose wheel of the aircraft until the end of take-off of the aircraft, the fourth sub-phase being detected by the transition of a pitch attitude of the aircraft to a value above a fourth predetermined threshold.

Thus, this system allows precise variation of the confidence assigned to the vision as a function of the take-off sub-phase, so that the faster the aircraft travels, the more the confidence in the vision is degraded due to vibrations.

According to one embodiment, the first predetermined threshold corresponds to a rotation speed, the value of which is selected from a range of 0.001 rad/s to 0.004 rad/s, and preferably of the order of 0.002 rad/s;

the second predetermined threshold corresponds to a wheel speed, the value of which is selected from a range of 1 kt to 3 kt, and preferably of the order of 1 kt;

the third predetermined threshold corresponds to a speed above a value selected from a range between 30 kt and 40 kt; and the fourth predetermined threshold corresponds to a pitch attitude above a value selected from a range between 1 degA and 2 degA.

Thus, the wheel speed provides a highly relevant and highly precise indication of the detection confidence, while allowing the moment at which the aircraft leaves the ground to be known.

Advantageously, in the case whereby the preliminary confidence index strictly ranges between 0% and 100%, the data consolidation module is configured to reduce the preliminary confidence index by increasing a covariance value relating to the consolidation of the data, and wherein, in the case whereby the preliminary confidence index equals 0, the data consolidation module is configured to determine the current position of the aircraft on the runway by only taking into account inertial data of the aircraft and speeds of the wheels.

Thus, the assisted take-off system is extremely reliable and only takes into account the vision device when the confidence in the vision is guaranteed.

Advantageously, the image processing modules are configured to:
- form a top view of the runway by producing a homography of each input image on the basis of the extrinsic and intrinsic parameters of the cameras of the image capture device;
- find, on the top view, a triplet of lines made up of a central axis and of lateral lines; and
- determine the preliminary current position of the aircraft on the runway by computing a deviation between the axis of the aircraft and the central axis of the runway.

This allows easy and highly precise detection of the central axis of the runway.

Advantageously, in the case whereby a direct detection of the central axis is not provided, the image processing modules are configured to indirectly estimate the position of the central axis on the basis of the lateral lines of the runway, which are spaced apart by a pre-recorded runway width in a data server of the aircraft, with the central axis being reconstructed by computing the median between the two lateral lines.

Thus, this system allows the detection to be extrapolated even if the central line or the lateral lines are hidden due to, for example, dirt or poor lighting.

Advantageously, the image capture device comprises a set of cameras positioned at different points of the aircraft, the image processing modules are configured to estimate the preliminary current position of the aircraft and the preliminary confidence index according to the streams of images from each camera, and wherein the consolidation module recovers the preliminary current position of the aircraft with the highest preliminary confidence index or recovers a statistical combination of the preliminary current positions in the case whereby the confidence indices are equal.

This allows the current images to be used with the highest visual confidence index.

Advantageously, the image capture device comprises a front camera intended to take images of the runway in front of the aircraft and a rear camera intended to take images of the runway behind the aircraft, so that, in the case whereby one of the two front and rear cameras is dazzled by the sun, the images taken by the other camera remain relevant.

Thus, the central axis can be detected at any instant independently of the direction of the sun.

A further aim of the disclosure herein is a method allowing automatic take-off of an aircraft from a runway, comprising the following steps of:
- taking a stream of images of the runway from the aircraft;
- estimating, on the basis of the streams of images, a preliminary current position of the aircraft on the runway and assigning a preliminary confidence index to the estimate;
- determining a relevant current position of the aircraft on the runway by correcting the estimate of the preliminary current position and determining a relevant confidence index by taking into account a current speed of the wheels of the aircraft in order to refine the preliminary confidence index; and
- controlling the take-off of the aircraft as a function of the relevant current position and of the relevant confidence index.

BRIEF DESCRIPTION OF THE DRAWINGS

Further features and advantages of the disclosure herein will become apparent from reading a preferred embodiment of the disclosure herein with reference to the following figures.

DETAILED DESCRIPTION

An underlying concept of the subject matter herein is a system allowing completely autonomous automatic take-off, basically using only the images captured by cameras on board the aircraft and avionics data that is already available.

A system allowing automatic take-off is understood hereafter to equally mean a system allowing the aircraft to take off from a runway without intervention from the pilot and a system assisting or guiding the pilot during take-off. In particular, the pilot can correct the commands generated by the automatic take-off system at any time.

Figure 1:
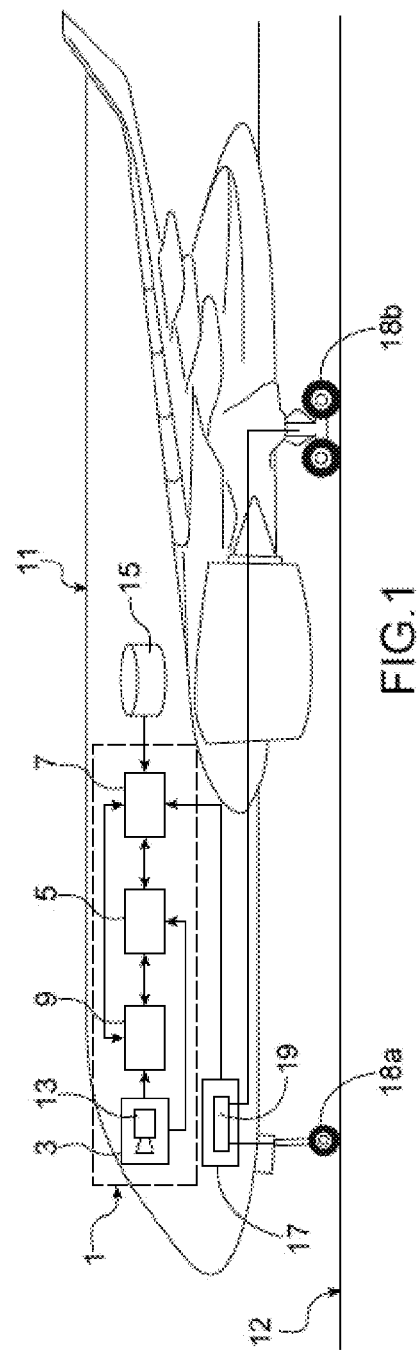
FIG. 1 schematically illustrates a system allowing automatic take-off of an aircraft, according to one embodiment of the disclosure herein.

FIG. 1 schematically illustrates a system allowing automatic take-off of an aircraft, according to one embodiment of the disclosure herein.

The automatic take-off system 1 comprises a vision and consolidation assembly comprising an image capture device 3, image processing modules 5, and a data consolidation module 7. The take-off system 1 further comprises a flight control computer 9.

The image capture device 3 is on board the aircraft 11 and comprises a set of cameras 13 mounted in the vertical plane of symmetry of the aircraft 11 and is adapted to take a stream of images of the terrain and, in particular, of the runway 12. Advantageously, part of the set of cameras 13 is adapted to look towards the front of the aircraft and another part of the set of cameras 13 is adapted to look towards the rear of the aircraft. The set of cameras 13 advantageously can comprise an EVS (Enhanced Vision System) system that is fitted to most recently constructed aircraft. This system is generally made up of a plurality of sensors (IR/visible cameras, millimetric radar, etc.) capable of providing images in all conditions, including reduced visibility conditions.

It will be noted that the intrinsic and extrinsic parameters of the cameras 13 are stored in a data server 15 of the aircraft and are available for the processing 5 and consolidation 7 modules. These parameters are used in a camera module to describe the mathematical relationship between the 3D coordinates of a point of the scene from which the light originates and the 2D coordinates of its projection onto an image plane. More specifically, the intrinsic parameters are parameters specific to the camera 13 itself, such as the focal length and the distortion of the objective lens. The extrinsic parameters are the parameters used to describe the transformation between the camera 13 and its outside world.

Furthermore, functional data comprising the positions of the various points (cameras, antenna, etc.) in the aircraft 11 are also stored in the data server 15 of the aircraft 11 and are available for the processing 5 and consolidation 7 modules.

Moreover, navigation data comprising information relating to the runway 12 (position, runway width, runway length, etc.) are also encoded in the data server 15 of the aircraft.

The image processing modules 5 receive avionics data, as well as the successive images taken by the image capture device 3 and process the data in order to estimate a current position (called preliminary current position) of the aircraft 11 on the runway 12. In particular, the image processing modules 5 are configured to find the central axis on the images and to compute the deviation between the axis of the aircraft and the central axis of the runway 12.

The image processing modules 5 are also configured to assign an intrinsic visual confidence index (called preliminary confidence index) to the estimate of the preliminary current position of the aircraft 11 on the runway 12.

The data consolidation module 7 can use an Extended Kalman Filter (EKF) to integrate accelerations over time, as well as the rate of yaw detected by an inertial unit of the aircraft or an Inertial Measurement Unit (HU). By using a 2D kinematics module this integration provides a prediction of the ground speed and the lateral deviation in relation to the runway 12.

More specifically, the data consolidation module 7 is connected as the input to the image processing modules 5, as well as via the aircraft network to avionics systems 17, a flight management system, a Wheel Steering Control system (WSCS) 19 and sensors of the aircraft, such as an inertial unit and an odometer.

The data consolidation module 7 is configured to determine a new estimate of the current position (called relevant current position) of the aircraft 11 on the runway by correcting the estimate of the preliminary current position. Indeed, data originating from the image processing modules 5 (for example, the geometric coordinates of straight lines detected on the images) are consolidated with inertial data to compute, using the Kalman filter, the relevant current position of the aircraft.

Furthermore, the data consolidation module 7 is adapted to recover the current wheel speed 18 of the aircraft from the WSCS 19, as well as, optionally, current inertial data originating from the inertial unit of the aircraft. The current speed 18a, 18b of the wheels of the aircraft allows the consolidation module 7 to correct or refine the preliminary visual confidence index in order to form a new, more precise visual confidence index (called relevant confidence index).

Thus, the relevant confidence index assigned to the vision is highly precise and is produced in real time as a function of the intrinsic confidence of image processing, as well as of the measurement of the speed of the wheels of the aircraft.

Moreover, the data consolidation module 7 is connected as the output to a flight control controller or computer 9 of the aircraft. The controller or computer is configured to activate or to deactivate the various algorithms implemented by the processing 5 and consolidation 7 modules as a function of the different conditions. Furthermore, the flight control computer 9 is configured to control and to guide the take-off of the aircraft 11 as a function of the relevant current position of the aircraft 11 on the runway 12 and of the relevant confidence index received from the consolidation module 7, thus safely dispensing with all other sources of information that can be unavailable in some airports.

Figure 2:
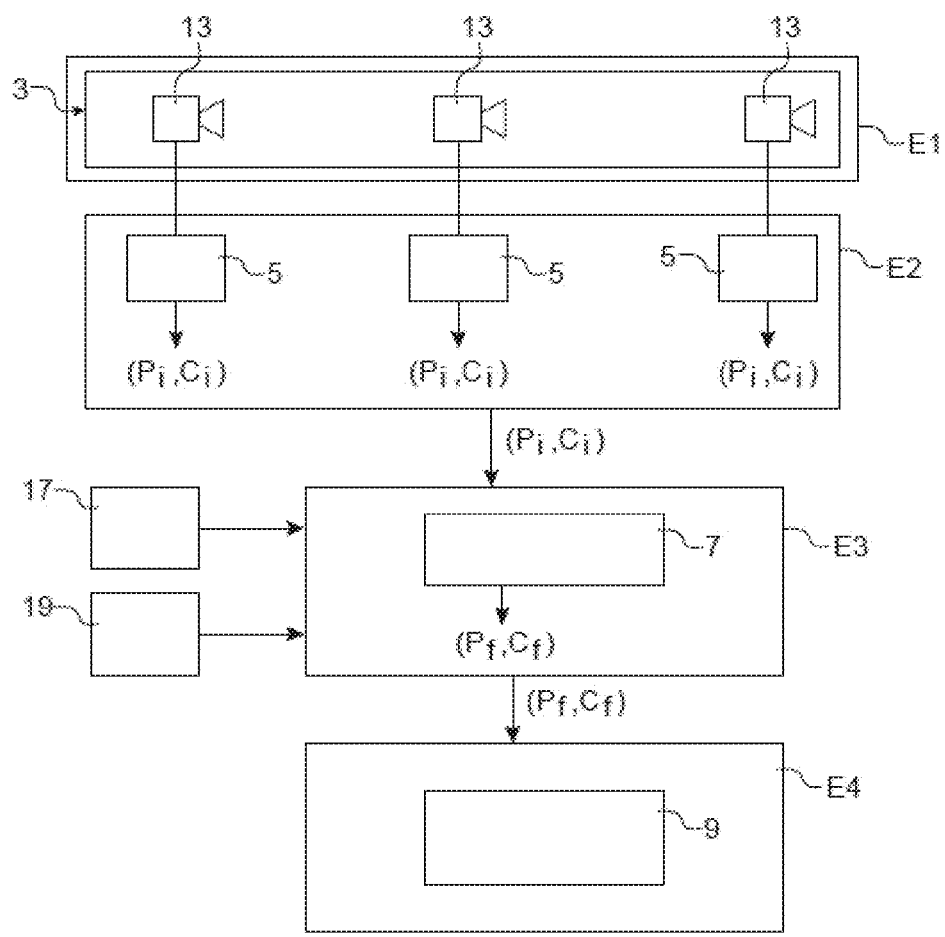
FIG. 2 schematically illustrates a method allowing automatic take-off of an aircraft, according to one embodiment of the disclosure herein.

FIG. 2 schematically illustrates a method allowing automatic take-off of an aircraft, according to one embodiment of the disclosure herein.

In step E1, the set of cameras 13 of the image capture device 3 is configured to take successive images of the runway. The stream of images output from each camera 3 is introduced into a corresponding image processing module 5.

In step E2, each image processing module 5 is configured to estimate the current position $P_i$ of the aircraft 11 and the visual confidence index $C_i$ according to the images from the corresponding camera 13.

Figure 3:
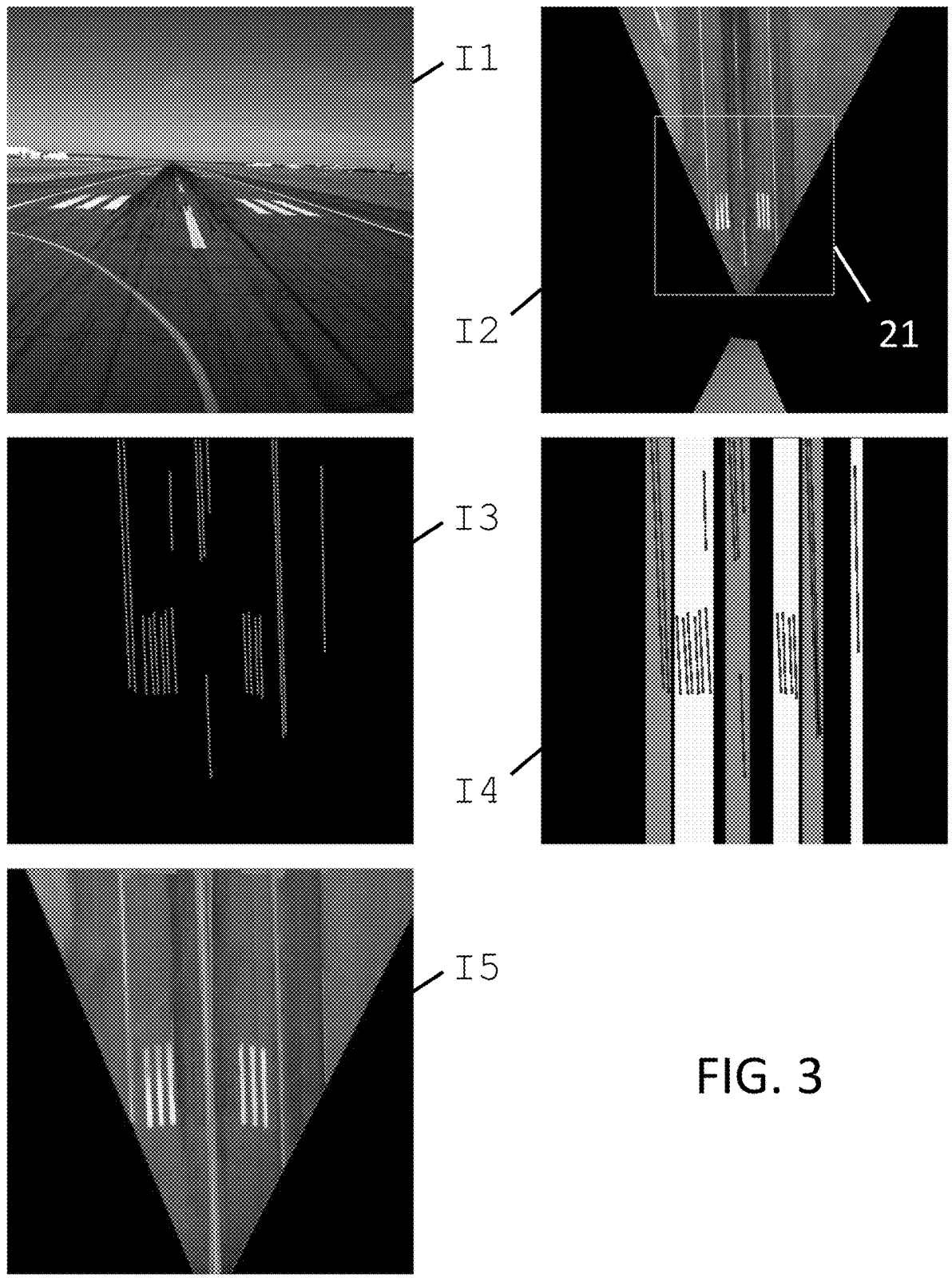
FIG. 3 is an image processing algorithm schematically illustrating the various steps carried out by an image processing module associated with a camera, according to one embodiment of the disclosure herein.

Indeed, FIG. 3 is an image processing algorithm schematically illustrating the various steps carried out by an image processing module associated with a camera, according to one embodiment of the disclosure herein.

This processing algorithm is illustrated for an image captured by a camera 13, knowing that the processing is similar for each camera of the image capture device 3.

The first image I1 of FIG. 3 is an input image representing the runway as captured by the camera 13. The other images I2-I5 illustrate the various processing operations carried out on the input image I1 by the image processing module 5.

Indeed, the image processing module 5 is configured to form, on the basis of the input image I1, a top view, called "bird's-eye view", of the runway, as shown on the second image I2. This top view is constructed by producing a homography of the input image I1 on the basis of the calibration and, more specifically, of the extrinsic and intrinsic parameters of the camera 13 that captured this image. More specifically, an injective linear application is completed for the input image I1 towards a projective space forming the plane of the second image I2. This projection deforms the input image I1 by converting convergent straight lines into parallel straight lines, while maintaining the projective structure of the initial image I1.

Then, the image processing module 5 is configured to find, on the top view (shown on image I2), a triplet of lines or segments made up of a central axis and of two lateral lines. A zone of interest 21 is firstly selected on the second image I2, allowing a detection algorithm implemented by the image processing module 5 to detect straight-line segments. The straight-line segments of the zone of interest 21 are simulated on a third image I3.

Then, the image processing module 5 is configured to find triplets on the third image I3 and to classify them, for example, by shades of grey. This classification is illustrated on the fourth image I4. It will be noted that for night vision, the straight-line segments are constructed on the basis of the lights on the runway before finding and classifying the triplets.

More specifically, the classification of the groups of segments detected on the fourth image I4 is carried out according to predetermined selection criteria. A first criterion relates to the runway width. Indeed, the left-hand and right-hand lateral lines of the runway are spaced apart by a runway width that is known and is pre-recorded in the data server 15 of the aircraft. A second criterion relates to the fact that the lateral lines are white on a dark area. A third criterion is the fact that the central line is coincident with the axis of symmetry of the detected lateral lines. It will be noted that all or some of the selection criteria of the groups of segments are used differently by the processing module 5 depending on the operating mode, selected from among an initialization mode, a nominal mode, and a reinitialization mode.

In the initialization mode, the best triplet of lines is sought. Once the best triplet of lines is confirmed for three successive frames, for example, the vision and consolidation assembly switches to nominal mode. It will be noted that in this initialization mode, the outputs sent by the consolidation module 7 to the flight control computer 9 are declared non-valid.

In the nominal mode, the processing algorithm is locked on the triplet of lines shown on the image I5 defined during the initialization and following its variation. The results are declared valid with the highest level of confidence (100%). However, in the case whereby a line is temporarily lost, the processing algorithm is configured to extrapolate the detection in order to reconstruct the missing line and still send a valid output with a confidence value that can drop to 0 depending on the quality of the detection.

More specifically, in the case whereby a direct detection of the central axis is not provided, due to, for example, dirt, poor lighting, or the removal of the markings on the runway, the image processing modules 5 are advantageously configured to indirectly estimate the position of the central axis, based on the lateral lines of the runway. Indeed, the central axis is reconstructed by computing the median between the two lateral lines, given that the lines are spaced apart by a runway width that is pre-recorded in the data server 15 of the aircraft, By way of an example, the central axis can be reconstructed in the event of the temporary loss of one or of two segments of the central axis not exceeding a predetermined duration of the order of a few seconds (for example, five seconds).

Finally, the reinitialization mode occurs if the processing algorithm is unable to reconstruct the central axis in normal mode or if the reconstruction is continuously carried out for a duration that is longer than the predetermined duration (for example, 5 seconds). During the reinitialization, the processing algorithm operates as in the initialization mode, but using a more precise selection on the width of the runway.

Thus, in step E2 (of FIG. 2), each image processing module 5 determines the preliminary current position Pi of the aircraft on the runway by computing a deviation between the axis of the aircraft and the central axis of the runway.

More specifically, the image processing module 5 is configured to firstly compute a distance between the aircraft 11 and the detected central axis of the runway. Then, it is configured to compute the angle or the deviation between the axis of the aircraft and the central axis. This type of computation can be carried out using an image processing and data analysis technique as described in French patent applications FR 3024127 and FR 3044807 filed by the present applicant.

Furthermore, the image processing module 5 is configured to provide the preliminary visual confidence index Ci according to the characteristics of the images of each camera. For example, the preliminary confidence index Ci is maximal (i.e. 100%) if the triplet of lines is directly visible and the runway width is precisely known. However, if, by following the lines, the course of a line is lost and an estimate is made using an indirect construction of the missing line, the preliminary confidence index Ci is reduced. This reduction depends on the lost line, given that the visibility of the central line is more important in the computation of the confidence index than the lateral lines. For example, if a lateral line is lost, the preliminary confidence index Ci transitions to 80%. By contrast, if it is the central line that is lost, the preliminary confidence index Ci transitions to 60%.

It will be noted that for night-time take-off, the light trails are used to reconstruct the lateral lines using the technique known as Hough transform, given that for night vision, the visibility of the central line is not as fundamental as for day vision.

Thus, on completion of step E2 of the method of FIG. 2, each image processing module 5 provides a preliminary current position Pi of the aircraft and a preliminary confidence index Ci specific to the corresponding camera.

In step E3 of FIG. 2, the consolidation module 7 is adapted to recover output data from the image processing module 5 and, in particular, the data relating to the preliminary current position Pi of the aircraft with the highest confidence index Ci, as well as the value of this preliminary index. In the case whereby several preliminary confidence indices are equal, the consolidation module 7 recovers a resulting preliminary position computed using a statistical combination (for example, an average) of these preliminary current positions.

Furthermore, the consolidation module 7 receives, from the WSCS system 19, the current speed 18a, 18b of the wheels of the aircraft and receives inertial avionics data from the avionics systems 17 of the aircraft. The consolidation module 7 is configured to mix the data received from the image processing modules 5 with the data received from the avionics systems 17 of the aircraft in order to process this data in order to identify, as precisely as possible, the difference in the guidance point of the appliance relative to the central axis of the runway using, for example, the lateral lines and the central longitudinal axis of the runway.

Furthermore, the consolidation module 7 is configured to compute, at all times, an estimate of the deviation between the central longitudinal axis of the runway and the longitudinal axis of the aircraft. The computation of the deviation is based on the process of consolidating data between geometric coordinates of detected straight lines and the inertial data. This type of computation is explained in detail in French patent applications FR 3024127 and FR 3044807 filed by the present applicant.

Thus, the data consolidation module 7 corrects the estimate of the preliminary current position Pi and determines a relevant current position Pf of the aircraft on the runway.

The consolidation module 7 is also configured to determine a relevant visual confidence index Cf by taking into account the current speed of the wheels of the aircraft. It will be noted that the outputs of the image processing modules 5 that are consolidated with inertial data to estimate (for example, using a Kalman filter) the position of the aircraft exhibit a certain level of imprecision, representing a covariance of the estimation error of the position. The current speed 18 of the wheels of the aircraft is then directly used to corroborate or refine the imprecision of the estimate, thus allowing a relevant visual confidence index Cf to be determined representing the confidence in the visual determination of the position of the aircraft. In general, the confidence assigned to the vision is degraded when the speed of the aircraft increases, given that an increase in the speed can cause an increase in vibrations.

More specifically, the consolidation module 7 is configured to determine the relevant confidence index Cf by multiplying the preliminary confidence index Cf by a multiplying factor. This multiplying factor is associated with a current take-off sub-phase from among a predetermined set of take-off sub-phases, given that a specific multiplying factor is associated with each take-off sub-phase.

The predetermined set of take-off sub-phases comprises four sub-phases classified according to the wheel speed, thus providing a highly relevant and highly precise indication of the detection confidence.

The first sub-phase, called "final turn" sub-phase, is associated with the state of alignment of the aircraft on the runway. By default, data consolidation starts in this first sub-phase when the "take-off" function is triggered. The "take-off" function is triggered during the detection of the runway and of the central line by the vision algorithm implemented by the image processor in association with the image capture device.

This first sub-phase thus triggers the start of the data consolidation. Moreover, the completion of the first sub-phase occurs when the absolute value of a yaw rate of the aircraft drops below a first predetermined speed of rotation threshold for at least one predetermined duration, for example, of the order of 2 s. This first predetermined threshold corresponds to a speed of rotation, the value of which is selected from an interval ranging from approximately 0.001 rad/s to 0.004 rad/s, Preferably, the first threshold is of the order of 0002 rad/s. In practice, the function exits the first "final turn" sub-phase in order to enter an "initial acceleration" phase.

It will be noted that initially, if GPS is not used, the consolidation module 7 does not have any information relating to the location of the aircraft and therefore assumes that the aircraft is centered and has zero speed. This inconsistency is quickly overcome by the fact that the consolidation module 7 takes into account the vision during the final turn.

The second sub-phase, called stop sub-phase, is associated with a possible stop before throttling up. This second sub-phase is detected by the transition of the speed 18 of the wheels to a value below a second predetermined threshold. This second predetermined threshold corresponds to a wheel speed, the value of which is selected from an interval ranging from approximately one knot (1 kt) to three knots (3 kt), and preferably of the order of one knot (1 kt).

The third sub-phase, called acceleration sub-phase, is associated with an acceleration of the rotation. This third sub-phase is detected by the transition of the wheel speed to a value above a third predetermined threshold. This third predetermined threshold corresponds to a speed above a specific value selected from an interval between 30 knots (30 kt) and forty knots (40 kt), and preferably above 40 kt.

The fourth sub-phase, called start of flight sub-phase, is associated with a period starting with the take-off of the nose wheel of the aircraft until the end of the take-off of the aircraft, thus allowing the moment the aircraft leaves the runway to be known. The fourth sub-phase is detected by the transition from a pitch attitude of the aircraft to a value above a fourth predetermined threshold. This fourth predetermined threshold corresponds to a pitch attitude above a value selected from an interval between 1 degA and 2 degA, and preferably above 1 degA. The estimate of the pitch attitude value originates from the integration of the accelerations and speeds of rotation by the Kalman filter.

The fourth threshold is also used to indicate a relative variation in relation to the pitch attitude when exiting the final turn in order to process an inclined runway.

It will be noted that, in the case whereby the preliminary confidence index Ci strictly ranges between 0% and 100% (i.e. is not equal to 1, but is strictly greater than 0), the data consolidation module 7 is configured to reduce this confidence index by increasing a covariance value relating to the consolidation of the data. Furthermore, in the case whereby the preliminary confidence index equals 0%, the data consolidation module 7 is configured to determine the current position of the aircraft on the runway, by only taking into account inertial and wheel speed data. Thus, the consolidation module 7 only takes into account the vision device when the confidence in the vision is guaranteed.

Advantageously, the consolidation module 7 classifies the precision levels of the images into confidence intervals on the basis of the various take-off sub-phases. These confidence intervals can be displayed on a human machine interface in the cockpit to assist and guide the pilot during the take-off phase.

In step E4, the flight control computer 9 is adapted to recover the relevant current position Pf of the aircraft and the relevant confidence index Cf from the consolidation module. This allows the flight control computer 9 to control the take-off of the aircraft as a function of the relevant current position Cf of the aircraft 11 on the runway 12 and of the relevant confidence index Cf.

Advantageously, the flight control computer 9 is configured to control the actuators of the aircraft in automatic mode, in order to make the aircraft take off. More specifically, the flight control computer 9 is configured to control the lateral and longitudinal maneuvers of the aircraft.

Figure 4:
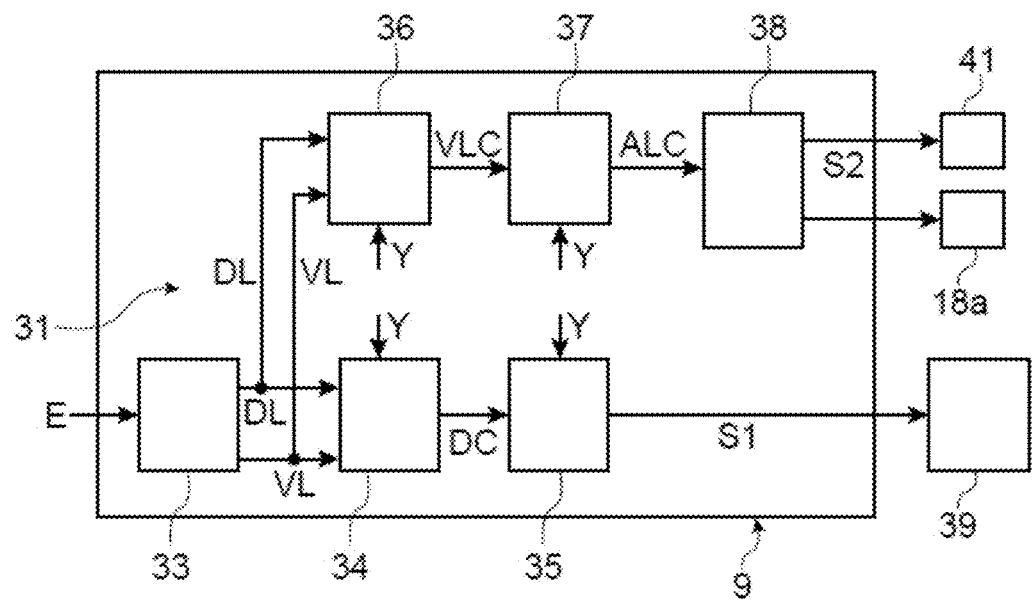
FIG. 4 schematically illustrates a system or laterally controlling the aircraft implemented by the flight control computer, according to one embodiment of the disclosure herein.

Indeed, FIG. 4 schematically illustrates a system for laterally controlling the aircraft implemented by the flight control computer, according to one embodiment of the disclosure herein.

The lateral control system 31 keeps the aircraft aligned on the axis of the runway and its principle is similar to that of automatic rolling guidance, called 'roll-out'. This lateral control system 31 comprises a runway mode estimator module RWY (runway) 33, a runway guidance loop module 34, and an internal yaw loop module 35, a roll-out guidance loop module 36, an internal roll-out loop module 37, and a kinematics module 38.

The runway mode estimator module 33 is connected, on the one hand, to a first branch comprising the guidance loop 34 and internal yaw loop 35 modules and, on the other hand, to a second branch comprising the roll-out guidance loop 36, internal roll-out loop 37 and kinematics 38 modules.

Input data E is introduced into the runway mode estimator module 33. This input data E includes a 'Q code' relating to the runway magnetic heading QFU (Q code for runway magnetic heading), the inertial speeds of the north/south and east/west wind, as well as the lateral deviation between the position of the LOC (deviation localizer) antenna of the aeroplane and the runway axis. An LOC deviation estimator integrated in the runway mode estimator module 33 allows the impact to be reduced of any runaway of the "lateral deviation" signal LOCDEV in the initial seconds. The runway mode estimator module 33 determines the lateral deviation DL and the lateral speed VL as a function of the input data E.

The data DL and VL (i deviation and lateral speed) output from the runway mode estimator module 33 is introduced into the runway guidance loop module 34 of the first branch, as well as into the roll-out guidance loop module 36 of the second branch.

The runway guidance loop module 34 also receives the yaw rate Y and determines controlled skidding DC as a function of the received data DL, VL and Y. The internal yaw loop module 34 then determines control signals S1 as a function of the controlled skidding DC and of the yaw rate Y. These control signals S1 are transmitted to a display system 39, for example, to a head-up display.

In the second branch, the roll-out guidance loop module 36 determines the controlled yaw rate VLC as a function of the lateral deviation DL and of the lateral speeds VL and yaw rates Y. In turn, the internal roll-out loop module 37 determines the controlled yaw acceleration ALC as a function of the yaw rate Y (lateral load factor and roll angle) and of the controlled yaw rate VLC. Finally, the kinematics module determines control signals S2 as a function of the controlled yaw acceleration ALC. The control signals S2 are then transmitted to the rudder 41 and to the front wheels 18a in order to control the lateral deviation of the aircraft.

The gains of the internal roll-out 37 and kinematics 38 modules are adjusted to take into account the specifics of take-off (need to dynamically control the front wheels 18a at low speed, moment of engine thrust, aerodynamic coefficients, etc.).

The lateral control system 31 allows common lateral guidance and a common lateral internal loop to be maintained for the take-off and roll-out phases. However, compared to the roll-out flight phase, the take-off phase faces several specific constraints.

A first constraint relates to the fact that the take-off command is triggered at very low speed and, in this case, the rudder 41 cannot be mainly used to correct the initial error, as for the roll-out phase.

A second constraint is the fact that the computed airspeed and Mach number, and therefore the effectiveness of the rudder 41, are not very precisely known at low speed.

A third constraint relates to the fact that the use of high thrust levels at more or less full power (TOGA or FLEX) affects the distribution of the load on the wheels of the aircraft, and therefore affects the effectiveness of the front wheels 18a.

A fourth constraint relates to the fact that an engine failure in the take-off phase has a greater impact on the trajectory of the aircraft.

Given these specifics, the lateral control system 31 according to the disclosure herein implements the following functions:

at low speed, the lateral control is mainly provided by the front wheels 18a, with the order for controlling the front wheels 18a being directly proportionate to the order for the internal loop. This allows rapid correction to be provided for the initial guidance error;

at intermediate speed, a transition on the control is implemented between the use of the front wheels 18a and the use of the rudder 41;

at high speed, the lateral control is mainly provided by the rudder 41, with the order for controlling the rudder 41 being directly proportionate to the order for the internal loop. This allows good stability to be provided for following the axes of the runway;

at low speed, the role of the internal loop integrators limited. Since the transfer function of the rudder 41 and of the front wheels 18a is very different, this avoids having instability during and after the transition of the front wheels 18a to the rudder 41;

the thrust moment of the engine is included in the computation of the load of the front wheels 18a in order to better assess their effectiveness on take-off and, consequently, to obtain reactive and stable control;

the thrust dissymmetry information of the engine is used to detect a case of a failure of an engine. As soon as this failure is detected:

a minimum ground speed control order VMCG (already computed in manual mode) is consolidated with the order of the lateral internal loop to accelerate the response of the aircraft after an engine failure event;

a pitch order is commanded to increase the load on the front wheels 18a and therefore their effectiveness.

This allows the aircraft to be automatically kept on the runway until take-off or until a possible Rejected Take-Off (RTO). In the event of the indication of an RTO maneuver, the lateral control remains active, but with the roll-out kinematics parameters. Indeed, a transition is implemented between the take-off law parameters and the roll-out law parameters. This allows an RTO to be carried out in automatic pilot mode and allows stable lateral control to be provided, while reusing the law parameters activated after a landing.

Figure 5:
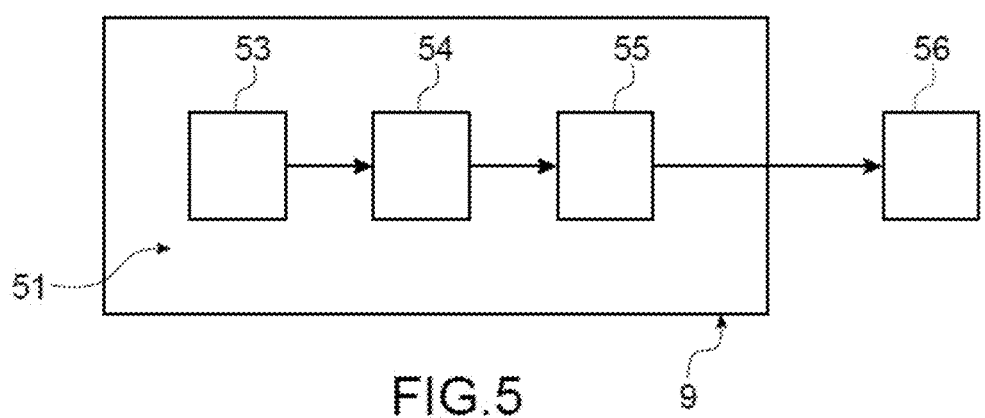
FIG. 5 schematically illustrate systems for the lateral and longitudinal control of the aircraft implemented by the flight control computer, according to one embodiment of the disclosure herein.

FIG. 5 schematically illustrates a longitudinal control system for the aircraft implemented by the flight control computer, according to one embodiment of the disclosure herein.

The longitudinal control system 51 comprises an automatic control lever module 53, a longitudinal kinematics module 54, and a rotation law by pitch speed objective module 55, called Q* law. The automatic control lever module 53 transmits, via the longitudinal kinematics module 54, an order to the Q* law module 55, which in turn transmits flight commands to the rudders 56 of the aircraft.

The longitudinal control system implements a procedure derived from the standard operating procedure that is defined as follows:

12° up to 80 knots;

transition from 12° to 5° between 80 kts and 100 kts;

10° rotation speed VR;

transition from −10° to 0° when the pitch angle theta>11.5° (8° in case of engine failure).

Furthermore, the automatic take-off phase 'ROTAUTOCL' is active:

as soon as the TOGA (take-off full power) law is active and the PITTO (pitch take-off) take-off mode is engaged; and until one of these conditions is met: take-off of the main landing gear+5 s; end of the rotation phase; theta greater than 11.5° confirmed at 1.5 s; and theta greater than 8° confirmed at 1.5 s in case of engine failure.

When ROTAUTOCL is no longer active, there is an internal loop transition from the order of the ROTATION law to the order of the normal law per objective vertical load factor NZ for approximately 4 seconds. The order of the external loop is then provided by the engaged SRS (Speed Reference System) active take-off mode.

Figure 6:
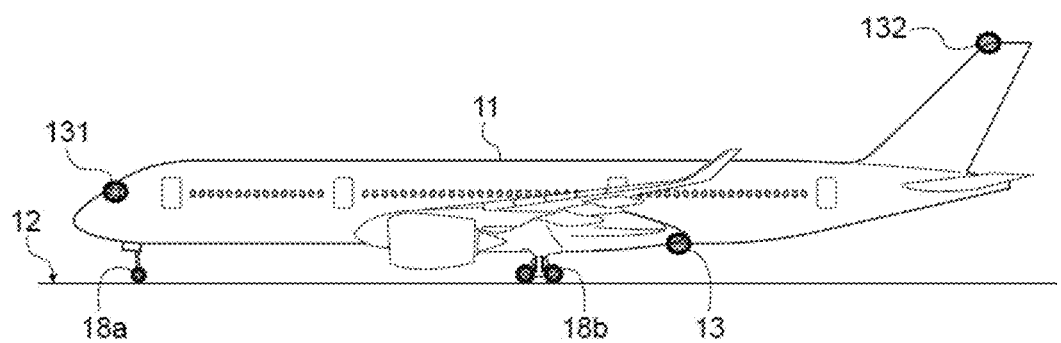
FIG. 6 schematically illustrates the installation of a vision device in an aircraft, according to one embodiment of the disclosure herein.

FIG. 6 schematically illustrates the installation of a vision device in an aircraft, according to one embodiment of the disclosure herein.

The image capture device comprises a set of cameras 13, 131, 132 positioned at various points of the aircraft 11. The cameras can be installed inside or outside the aircraft and directed towards the outside. It will be noted that the cameras installed outside the aircraft are pressurized and well protected.

Advantageously, the image capture device 3 comprises a front camera 131 intended to take images of the runway in front of the aircraft and a rear camera 132 intended to take images of the runway behind the aircraft. Thus, in the case whereby one of the two front 131 and rear 132 cameras is dazzled by the sun, the images taken by the other camera remain relevant, allowing the central axis to be detected at any instant independently of the direction of the sun.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system allowing automatic take-off of an aircraft from a runway, the system comprising:
    an image capture device onboard the aircraft to take a stream of images of the runway;
    image processing modules configured to estimate, on a basis of the stream of images, a preliminary current position of the aircraft on the runway and to assign a preliminary confidence index to the estimate;
    a data consolidation module configured to determine a relevant current position of the aircraft on the runway by consolidating data originating from the image processing modules with inertial data to correct the estimate of the preliminary current position and to determine a relevant confidence index by taking into account a current speed of the wheels of the aircraft to refine the preliminary confidence index; and
    a flight control computer configured to control and to guide the take-off of the aircraft as a function of the relevant current position and of the relevant confidence index received from the data consolidation module.

2. The system according to claim 1, wherein the data consolidation module is further configured to determine the relevant confidence index by multiplying the preliminary confidence index by a multiplying factor associated with a current take-off sub-phase from among a predetermined set of take-off sub-phases, with a specific multiplying factor being associated with each take-off sub-phase.

3. The system according to claim 2, wherein the predetermined set of take-off sub-phases comprises:
    a first final turn sub-phase associated with a state of alignment of the aircraft on the runway, the first sub-phase triggering a start of data consolidation, completion of the first sub-phase occurring when an absolute value of a yaw rate of the aircraft falls below a first predetermined rotation speed threshold for at least one predetermined duration;
    a second stop sub-phase associated with a possible stop before throttling up, the second sub-phase being detected by the transition of the wheel speed to a value below a second predetermined threshold;
    a third acceleration sub-phase associated with an acceleration up to rotation, the third sub-phase being detected by the transition of the wheel speed to a value above a third predetermined threshold; and
    a fourth start of flight sub-phase associated with a period beginning with the take-off of a nose wheel of the aircraft until an end of take-off of the aircraft, the fourth sub-phase being detected by a transition of a pitch attitude of the aircraft to a value above a fourth predetermined threshold.

4. The system according to claim 3, wherein:
    the first predetermined threshold corresponds to a rotation speed, a value of which is from a range of 0.001 radians per second (rad/s) to 0.004 rad/s, or of an order of 0.002 rad/s;
    the second predetermined threshold corresponds to a wheel speed, a value of which is from a range of 1 knot (kt) to 3 kt, or of an order of 1 kt;
    the third predetermined threshold corresponds to a speed above a value from a range between 30 kt and 40 kt; and
    the fourth predetermined threshold corresponds to a pitch attitude above a value from a range between 1 degree (deg) and 2 (deg).

5. The system according to claim 1, wherein:
    when the preliminary confidence index strictly ranges between 0% and 100%, the data consolidation module is further configured to reduce the preliminary confidence index by increasing a covariance value relating to consolidation of the data originating from the image processing modules with the inertial data; and
    when the preliminary confidence index equals zero, the data consolidation module is further configured to determine the current position of the aircraft on the runway by only taking into account the inertial data of the aircraft and the wheel speed.

6. The system according to claim 1, wherein the image processing modules are further configured to:
    form a top view of the runway by producing a homography of each input image on a basis of extrinsic and intrinsic parameters of the cameras of the image capture device;
    find, on the top view, a triplet of lines made up of a central axis and of two lateral lines; and
    determine the preliminary current position of the aircraft on the runway by computing a deviation between an axis of the aircraft and a central axis of the runway.

7. The system according to claim 6, wherein, in case a direct detection of the central axis is not provided, the image processing modules are further configured to indirectly estimate a position of the central axis on a basis of lateral lines of the runway, which are spaced apart by a prerecorded runway width in a data server of the aircraft, with the central axis being reconstructed by computing a median between the two lateral lines.

8. The system according to claim 1, wherein:
    the image capture device comprises a set of cameras positioned at different points of the aircraft;

the image processing modules are further configured to estimate the preliminary current position of the aircraft and the preliminary confidence index according to the stream of images from each camera of the set of cameras; and the data consolidation module is further configured to:
recover the preliminary current position of the aircraft with a highest preliminary confidence index; or
recover, when the confidence indices are equal, a statistical combination of the preliminary current positions.

9. The system according to claim 1, wherein the image capture device comprises a front camera to take images of the runway in front of the aircraft and a rear camera to take images of the runway behind the aircraft, so that, when the front camera has a degraded image quality caused by the sun, the images taken by the rear camera remain relevant and, when the rear camera has a degraded image quality caused by the sun, the images taken by the front camera remain relevant.

10. A method allowing automatic take-off of an aircraft from a runway, the method comprising:
taking, using an image capture device onboard the aircraft, a stream of images of the runway from the aircraft;
estimating, using image processing modules and on a basis of the stream of images, a preliminary current position of the aircraft on the runway and assigning a preliminary confidence index to the estimate;
determining, using a data consolidation module, a relevant current position of the aircraft on the runway by consolidating data originating from the image processing modules with inertial data to correct the estimate of the preliminary current position;
determining, using the data consolidation module, a relevant confidence index by taking into account a current speed of the wheels of the aircraft to refine the preliminary confidence index; and
controlling and guiding, using a flight control computer, the take-off of the aircraft as a function of the relevant current position and of the relevant confidence index received by the data consolidation module.

11. The method according to claim 10, wherein the data consolidation module is further configured to determine the relevant confidence index by multiplying the preliminary confidence index by a multiplying factor associated with a current take-off sub-phase from among a predetermined set of take-off sub-phases, with a specific multiplying factor being associated with each take-off sub-phase.

12. The method according to claim 11, wherein the predetermined set of take-off sub-phases comprises:
a first final turn sub-phase associated with a state of alignment of the aircraft on the runway, the first sub-phase triggering a start of data consolidation, completion of the first sub-phase occurring when an absolute value of a yaw rate of the aircraft falls below a first predetermined rotation speed threshold for at least one predetermined duration;
a second stop sub-phase associated with a possible stop before throttling up, the second sub-phase being detected by the transition of the wheel speed to a value below a second predetermined threshold;
a third acceleration sub-phase associated with an acceleration up to rotation, the third sub-phase being detected by the transition of the wheel speed to a value above a third predetermined threshold; and
a fourth start of flight sub-phase associated with a period beginning with the take-off of a nose wheel of the aircraft until an end of take-off of the aircraft, the fourth sub-phase being detected by a transition of a pitch attitude of the aircraft to a value above a fourth predetermined threshold.

13. The method according to claim 12, wherein:
the first predetermined threshold corresponds to a rotation speed, a value of which is from a range of 0.001 radians/second (rad/s) to 0.004 rad/s, or of an order of 0.002 rad/s;
the second predetermined threshold corresponds to a wheel speed, a value of which is from a range of 1 knot (kt) to 3 kt, or of an order of 1 kt;
the third predetermined threshold corresponds to a speed above a value from a range between 30 kt and 40 kt; and
the fourth predetermined threshold corresponds to a pitch attitude above a value from a range between 1 degrees (deg) and 2 deg.

14. The method according to claim 10, comprising:
when the preliminary confidence index strictly ranges between 0% and 100%, reducing, using the data consolidation module, the preliminary confidence index by increasing a covariance value relating to consolidation of the data originating from the image processing modules with the inertial data; and
when the preliminary confidence index equals zero, determining, using the data consolidation module, the current position of the aircraft on the runway by only taking into account the inertial data of the aircraft and the wheel speed.

15. The method according to claim 10, comprising using the image processing modules to:
form a top view of the runway by producing a homography of each input image on a basis of extrinsic and intrinsic parameters of the cameras of the image capture device;
find, on the top view, a triplet of lines made up of a central axis and of two lateral lines; and
determine the preliminary current position of the aircraft on the runway by computing a deviation between an axis of the aircraft and a central axis of the runway.

16. The method according to claim 15, comprising, when a direct detection of the central axis is not provided, indirectly estimating, using the image processing modules, a position of the central axis on a basis of lateral lines of the runway, which are spaced apart by a pre-recorded runway width in a data server of the aircraft, with the central axis being reconstructed by computing a median between the two lateral lines.

17. The method according to claim 10, wherein the image capture device comprises a set of cameras positioned at different points of the aircraft, the method comprising:
estimating, using the image processing modules, the preliminary current position of the aircraft and the preliminary confidence index according to the stream of images from each camera of the set of cameras; and
recovering, using the data consolidation module:
the preliminary current position of the aircraft with a highest preliminary confidence index; or
when the confidence indices are equal, a statistical combination of the preliminary current positions.

18. The method according to claim 10, wherein the image capture device comprises a front camera to take images of the runway in front of the aircraft and a rear camera to take images of the runway behind the aircraft, so that, when the front camera has a degraded image quality caused by the sun, the images taken by the rear camera remain relevant and, when the rear camera has a degraded image quality caused by the sun, the images taken by the front camera remain relevant.

* * * * *